(No Model.)

W. HYRE.
CORN HUSKING PLATFORM FOR WAGONS.

No. 252,381. Patented Jan. 17, 1882.

Witnesses:
William Magley
M. M. Forbes

Inventor:
Wesley Hyre,
per C. H. Woodworth,
Attorney

UNITED STATES PATENT OFFICE.

WESLEY HYRE, OF THORN CREEK TOWNSHIP, WHITLEY COUNTY, INDIANA.

CORN-HUSKING PLATFORM FOR WAGONS.

SPECIFICATION forming part of Letters Patent No. 252,381, dated January 17, 1882.

Application filed August 8, 1881. (No model.)

*To all whom it may concern:*

Be it known that I, WESLEY HYRE, a citizen of the United States, residing in Thorn Creek township, Whitley county, Indiana, and whose post-office address is Columbia City, Whitley county, Indiana, have invented a new and useful Corn-Husking Attachment for Farm-Wagons, of which the following is a specification.

My invention relates to the attachment of certain mechanical devices to the bodies or boxes of ordinary farm-wagons, to serve as supports for holding unhusked cornstalks while the ears of corn are being husked from the same, thus providing a neater, more convenient, and less tiresome arrangement for husking corn than is practicable when the old method is followed. I attain these objects by the mechanism illustrated in the accompanying drawings, in which—

Figure 1:
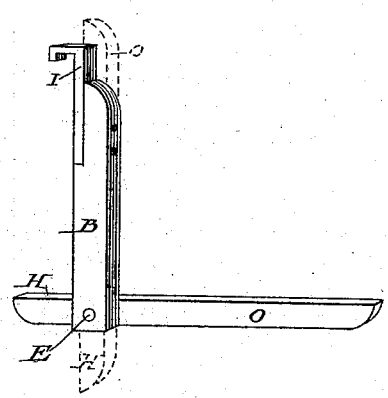
Figure 2:
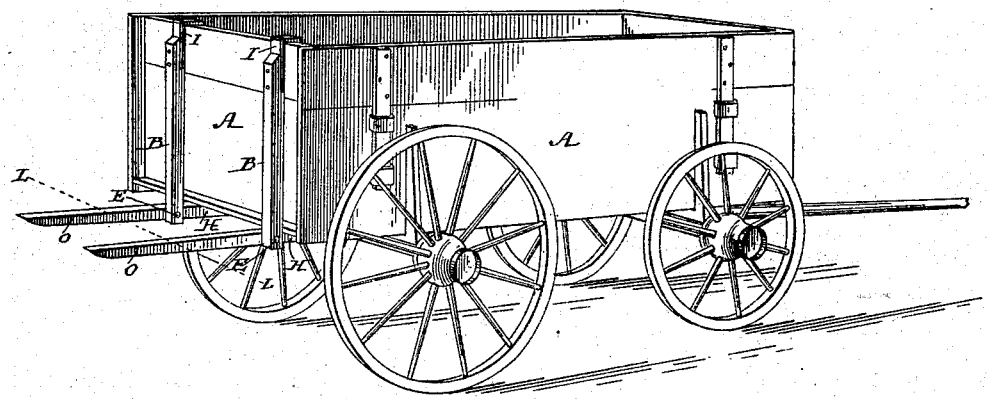

Figure 1 is a detailed view, in perspective, of one of my corn-husking attachments shown separately and apart from the wagon-box; and Fig. 2 is a side and end view of a farm-wagon with two of the husking-frames attached to the wagon-box and ready for use.

Similar letters refer to similar parts in both views.

My invention, which I term a "husking-frame," Fig. 1, consists of the hanger B and the support O, jointed together by a rod or bolt, as shown at E, the hanger being provided with a hook, I, at its upper end. The support O is made about three feet long, and is jointed to hanger B at about six inches from one end of said support, whereby a length of about six inches of the support projects beyond the hanger, as shown at H, Fig. 1.

A, Fig. 2, shows the bed or box of an ordinary farm-wagon mounted on running-gears, ready for use. To the end-gate of the box two of my husking-frames are attached by means of the hooks I I, and the projecting parts H H of the supports are inserted under the bottom of the box. The lengths of hangers B B and hooks I I are so adjusted that the longer ends of supports O O stick out at the rear end of the wagon-box, and are held in a horizontal position parallel to each other by the projecting parts H H coming in contact with the bottom of the wagon-box, as shown. The two husking-frames being thus attached to the wagon-box about two feet apart, the supports O O constitute a platform, across and on which the unhusked cornstalks are laid in about the position and direction indicated by the dotted line L L. It is evident that when thus placed on the two supports the stalks are raised from the ground sufficiently so that the husker can stand up in a comfortable attitude, conveniently husk the corn from the stalks, and throw the ears into the wagon-box, which is always directly before him.

It is apparent that at least two of the husking-frames must be attached to the wagon box to support the cornstalks, and it is also evident that as many as three sets of two frames each may be used at once on one wagon-box by attaching them to the sides of the box as well as to the end. By the use of these frames in sets of two, as indicated, the cornstalks are kept up out of the mud or dirt, the husker stands up instead of sitting or kneeling on the ground, the ears of corn are easily and conveniently thrown into the wagon-box, the fodder and husked corn are kept in better condition, and more and better work can be done in a given time than under the old plan of husking the ears from the stalks while on the ground. These frames are easily and quickly attached to or removed from the wagon-box. When not in use the frames are folded up, as shown in Fig. 1.

I claim as my invention—

1. The hanger B, provided with the hook I, in combination with the pivoted support O, substantially as described.

2. In a corn-husking attachment for wagons, the combination of the detachable hooked supports B B with the pivoted supports O O, substantially as described.

WESLEY HYRE.

Witnesses:
ARTHUR M. SPORE,
J. C. WIGENT.